(12) United States Patent
Zuber et al.

(10) Patent No.: US 8,002,167 B2
(45) Date of Patent: Aug. 23, 2011

(54) METHOD OF PRODUCING A TUBE CONNECTION, AND TUBE CONNECTION

(75) Inventors: Armin Zuber, Bad Lippspringe (DE); Michael Wibbeke, Paderborn (DE); Simon Potthast, Altenbeken-Schwaney (DE)

(73) Assignee: Benteler Automobiltechnik GmbH, Paderborn (DE)

( * ) Notice: Subject to any disclaimer, the term of this patent is extended or adjusted under 35 U.S.C. 154(b) by 284 days.

(21) Appl. No.: 12/325,691

(22) Filed: Dec. 1, 2008

(65) Prior Publication Data

US 2009/0152865 A1 Jun. 18, 2009

(30) Foreign Application Priority Data

Dec. 13, 2007 (DE) .......................... 10 2007 060 116

(51) Int. Cl.
*B23K 9/00* (2006.01)
*B23K 1/20* (2006.01)
*B23K 35/12* (2006.01)
(52) U.S. Cl. ......................... 228/135; 228/168; 228/246
(58) Field of Classification Search ........... 219/59.1–67; 228/165, 173.1, 173.4, 174, 245–246, 137, 228/120

See application file for complete search history.

(56) References Cited

U.S. PATENT DOCUMENTS

| 2,528,040 | A  | * | 10/1950 | Crouch .......................... 228/154 |
| 2,996,600 | A  | * | 8/1961  | Gardner, Jr. et al. ............ 219/61 |
| 4,002,286 | A  | * | 1/1977  | Simon ........................... 228/174 |
| 5,421,642 | A  | * | 6/1995  | Archibald ....................... 301/65 |
| 6,491,351 | B1 | * | 12/2002 | Mikami .................... 301/63.101 |
| 6,552,294 | B1 | * | 4/2003  | Ananthanarayanan et al. ............................ 219/107 |
| 6,589,671 | B1 | * | 7/2003  | Kehrer .......................... 428/683 |
| 6,998,560 | B2 | * | 2/2006  | Ananthanarayanan et al. 219/61 |
| 7,631,946 | B2 | * | 12/2009 | Francischetti .......... 301/63.104 |
| 7,726,024 | B2 | * | 6/2010  | Ishii et al. ................ 29/890.038 |
| 2010/0040408 | A1 | * | 2/2010 | Zuber et al. ................... 403/271 |

FOREIGN PATENT DOCUMENTS

DE 4117594 A1 * 10/1991
JP 60015069 A * 1/1985

\* cited by examiner

*Primary Examiner* — Kiley Stoner
*Assistant Examiner* — Carlos Gamino
(74) *Attorney, Agent, or Firm* — Barnes & Thornburg LLP

(57) ABSTRACT

A method for connecting a tube and a cast component includes widening an end section of the tube to form a widened section, positioning the cast component adjacent to the widened section, and welding the cast component to enclose at least a portion of the widened section with a weld deposit in at least one step, thereby locking the tube and the cast component together. A connection between a tube and a cast component is also provided.

15 Claims, 4 Drawing Sheets

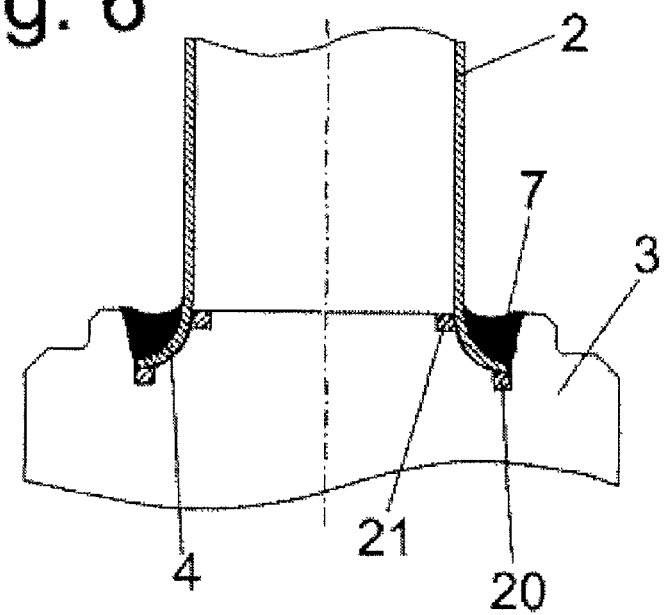
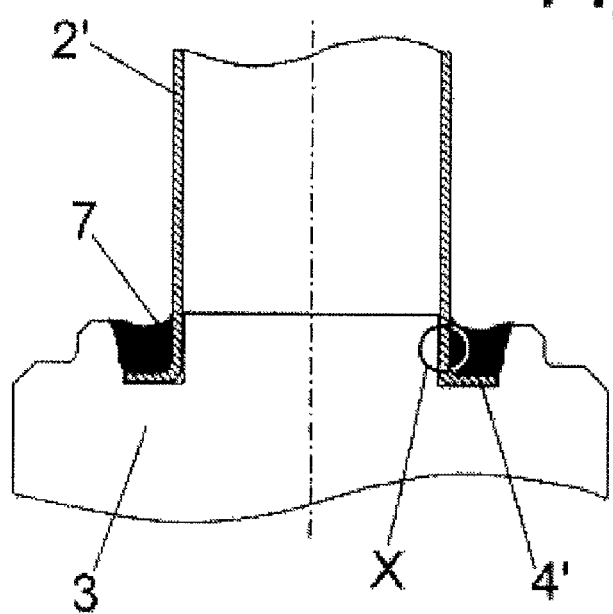
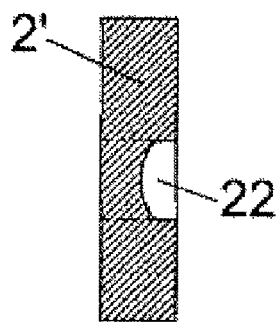

METHOD OF PRODUCING A TUBE CONNECTION, AND TUBE CONNECTION

CROSS-REFERENCE TO RELATED APPLICATIONS

This United States Non-Provisional Patent Application relies for priority on German Patent Application No. 10 2007 060 116.8, filed on Dec. 12, 2007, the contents of which are incorporated herein by reference.

FIELD OF THE INVENTION

The present invention relates to a method of producing a tube connection having a tube and a component made of cast material and to a corresponding tube connection.

DESCRIPTION OF RELATED ART

To connect components made of steel and cast material, cold joining methods are used in some instances. In particular, the components are connected to one another by riveting or screwing. However, the strength of such connections is limited on account of their point-like force transmission.

In fusion welding methods, such as MIG (metal inert gas) welding for example, there is the problem that welding may not be possible on account of the greatly differing melting points of the two materials—steel and cast material. Thermal methods of welding include braze welding processes in which only the cast material is melted and, as a result, a galvanized steel sheet is wetted by the weld deposit. Due to the galvanizing of the steel sheet, the intermetallic phases can be reduced to a small proportion. However, these integral connections have only low strength.

SUMMARY OF THE INVENTION

It is therefore the object of the present invention to provide a method of producing a tube connection and to provide a tube connection, in which method a tube is connected to a component made of cast material by means of welding and the connection has high strength. The invention, therefore, makes it possible for material pairings that cannot be welded to one another to be fixed to one another.

This object is achieved by a method and by a tube connection described herein.

In the method according to the invention, an end section of the tube first is widened and the component made of cast material is arranged on the widened section of the tube. The component made of cast material is then welded in such a way that the widened section of the tube is enclosed at least partly in a positive-locking manner. This achieves the effect that the weld deposit engages behind the widened section of the tube and, thus, a fixed connection both in the radial direction of the tube and in the axial direction is ensured. Due to the positive-locking enclosing of the widened section of the tube, both galvanized and ungalvanized tubes can be used.

For an especially robust tube connection, the widened section can be enclosed in an annular manner by a weld during the welding of the component made of cast material.

In order to widen the end section of the tube radially outward, the end section can be flanged or flared. The widening must be effected to such an extent that the weld deposit can engage behind the widened section.

The tube with the section widened at the end is preferably pressed against a stop on the component made of cast material, and a ring around the end section of the component made of cast material is then welded in order to produce a positive-locking connection. In this case, the tube connection thus produced can be loaded both in tension and compression in the axial direction and can also be subjected to a bending load.

To increase the torsional strength of the connection, one or more apertures may be provided on the widened section of the tube before the welding. These apertures or openings are then filled with a weld deposit and/or projections of the component made of cast material. They may also provide for a robust connection in the direction of rotation. Instead of the apertures, the tube in the region of the weld may also be provided with a profiled portion, for example recesses, beads, undercuts, etc., so that the weld deposit flows into the profiled regions. Alternatively, it is possible for the widened section to be of oval shape in cross section, such that the torsional strength is increased as a result.

The tube connection according to the invention has a tube having, at the end, a widened section which projects radially outward and which is enclosed at least partly in a positive-locking manner by the component made of cast material. This produces a fixed tube connection which can also be used in particular for producing axles or axle components in vehicle construction. This is because such hybrid connections consisting of a tube, in particular a steel tube, and a component made of cast material, such as a light metal, in particular aluminum, can be used for reducing the weight instead of a connection of steel components.

A weld integrally connected to the component made of cast material is preferably provided for enclosing the widened section of the tube. For especially high strength, the weld may be built up in multiple passes.

For securing the tube connection even during loading in the radial direction of the tube, a receptacle for fitting the widened section can be formed on the component made of cast material, said receptacle surrounding at least a region of the widened section in the radial direction. As a result, a step which can be used for force transmission is formed on the cast part.

BRIEF DESCRIPTION OF THE DRAWINGS

The invention is explained in more detail below, on the basis of a plurality of exemplary embodiment, with reference to the attached drawings, in which:

FIG. 4 shows a sectioned view of a modified embodiment of a tube connection;

FIG. 6 shows a sectioned view of a further embodiment of a tube connection; and

FIGS. 7A, 7B show two views of a tube connection according to the invention with a profiled tube.

DETAILED DESCRIPTION OF EMBODIMENT(S) OF THE INVENTION

The invention is now described in connection with one or more embodiments. As should be understood, the embodiments are intended to be exemplary of the invention and not limiting thereof. The scope of the invention encompasses further embodiments and variations, as should be appreciated by those skilled in the art.

Figure 1:
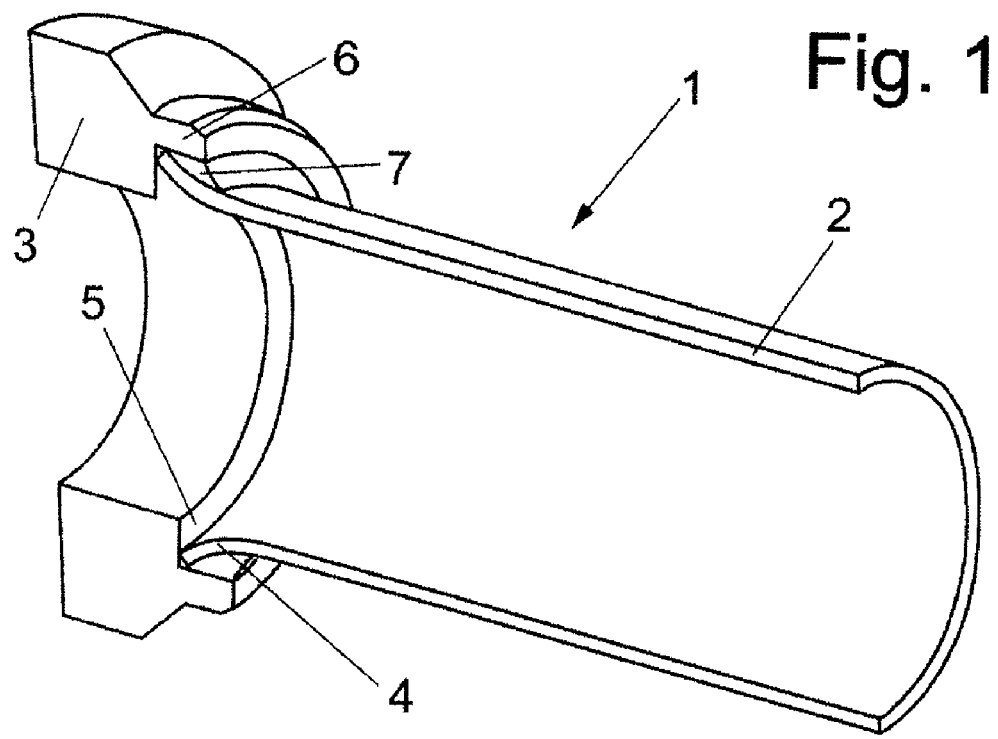
FIG. 1 shows a perspective view of a tube connection according to the invention.

With reference to FIG. 1, a tube connection 1 comprises a tube 2, to which a component 3 made of a cast material, preferably aluminum, is fixed. Suitable cast materials include, in particular, light metals, in which case, in addition to aluminum, magnesium alloys or cast steel may also be used. The tube 2 is preferably made of steel, but can also be made of other metals.

Only one connection between a tube 2 and a component 3 made of a cast material is shown below in each case. It is of course possible to fasten a plurality of tubes 2 to the component 3 made of cast material and thereby produce a connection node.

At the end, the tube 2 comprises a widened section 4 which projects radially outward and bears against an axial stop 5 of the component 3. The widened section 4 arranged at the end is in this case surrounded by a ring 6 of the component 3 and is enclosed on the outer side by a weld deposit 7 (also referred to as a "weld bead"). The weld deposit 7 can be introduced by welding the component 3, for example by means of MIG (metal inert gas) welding.

The tube 2 is connected to the aluminum component 3 in a positive-locking manner via the widened section 4, the section 4 bearing against a stop 5 on the one hand and against the weld deposit 7 on the other hand. The tube connection 1 can, therefore, be loaded in both tension and compression in the axial direction.

Figure 2:
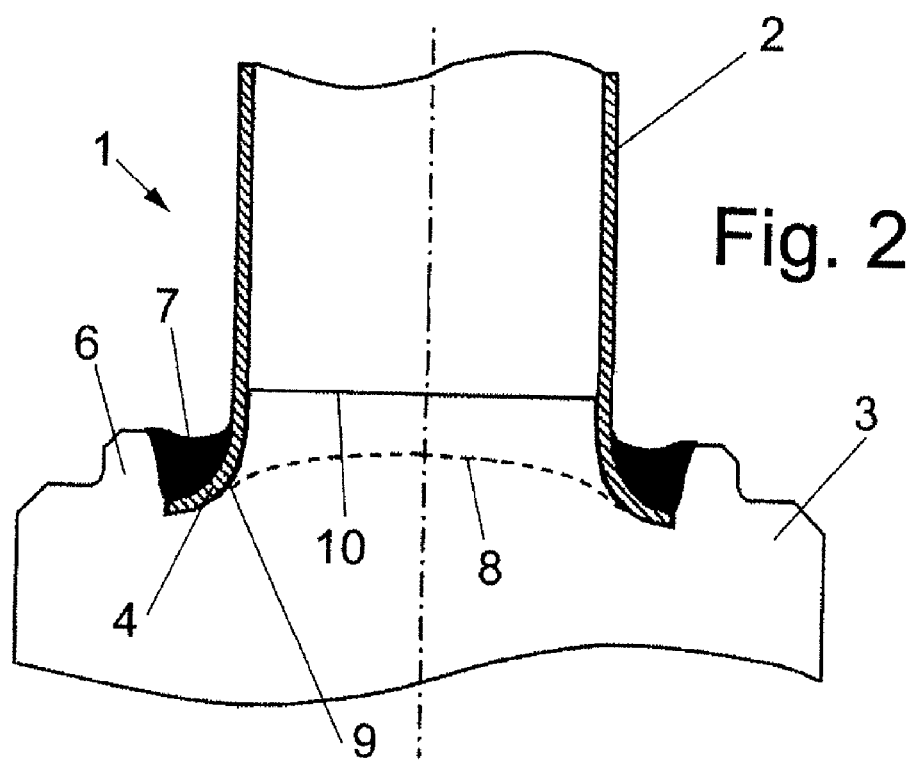
FIG. 2 shows a sectioned view of the tube connection of FIG. 1.

The tube 2 is shown in section in FIG. 2 and comprises, at the end, a flared section 4 which is curved outward at the cylindrical tube via a bend 9. The bend 9 is supported on the inner side via a connection piece 10 of the component 3, the connection piece 10 also engaging in a cylindrical region of the tube 2. As a result, an especially tight connection is obtained. It is also possible to design the connection piece 10 to be shorter, as indicated by the broken line 8. The connection piece 10 may also be designed to be hollow on the inside in order to save weight.

Figure 3:
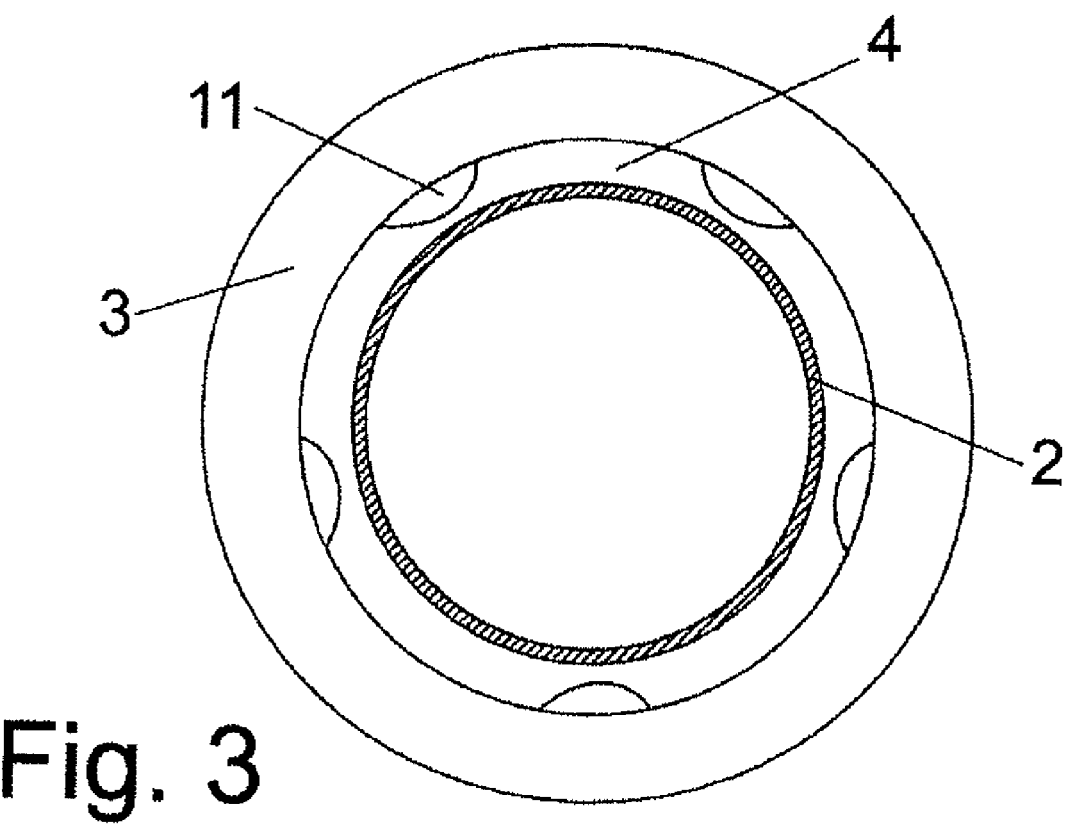
FIG. 3 shows a sectioned plan view of the tube connection of FIG. 1.

The widened section 4 of the tube 2 is shown in FIG. 3, and a plurality of apertures 11, which are distributed over the circumference, are provided on the section 4. The apertures 11 are filled with weld deposit 7, such that a torsionally fixed connection is produced between the tube 2 and the component 3. The apertures 11 are arranged on the circumference of the widened section 4, it also being possible to provide the apertures as openings inside the section 4, for example in the region of the bend 9. In this case, the component 3 made of cast material may also have one or more projections which engage in corresponding openings or apertures on the widened section 4 or the bend 9.

Shown in FIG. 4 is a modified embodiment of a tube connection in which a tube 2' is used which has an end section 4' which is produced by flanging and which projects radially. As a result, instead of the bend 9, an edge 9' is formed as transition between the tube 2' and the section 4'. Apart from that, the connection to the component 3 made of cast material is designed as in the preceding exemplary embodiment, the section 4' bearing on one side against the stop 5 of the aluminum component 3 and being surrounded on the opposite side by weld deposit 7. As a result, the tube 2' is fixedly connected to the aluminum component 3 in both the axial and the radial direction. The weld deposit 7 is surrounded on the radially outer side by a ring 6 of the component 3. The transition between the weld deposit 7 and the tube 2' is designed in such a way that the weld deposit 7 runs onto the tube 2', that is to say a bend is formed adjacent to the tube 2', and this bend extends radially inward in a direction away from the widened section 4'. This avoids a gap between weld deposit 7 and tube 2', in which gap moisture may subsequently collect.

Figure 5:
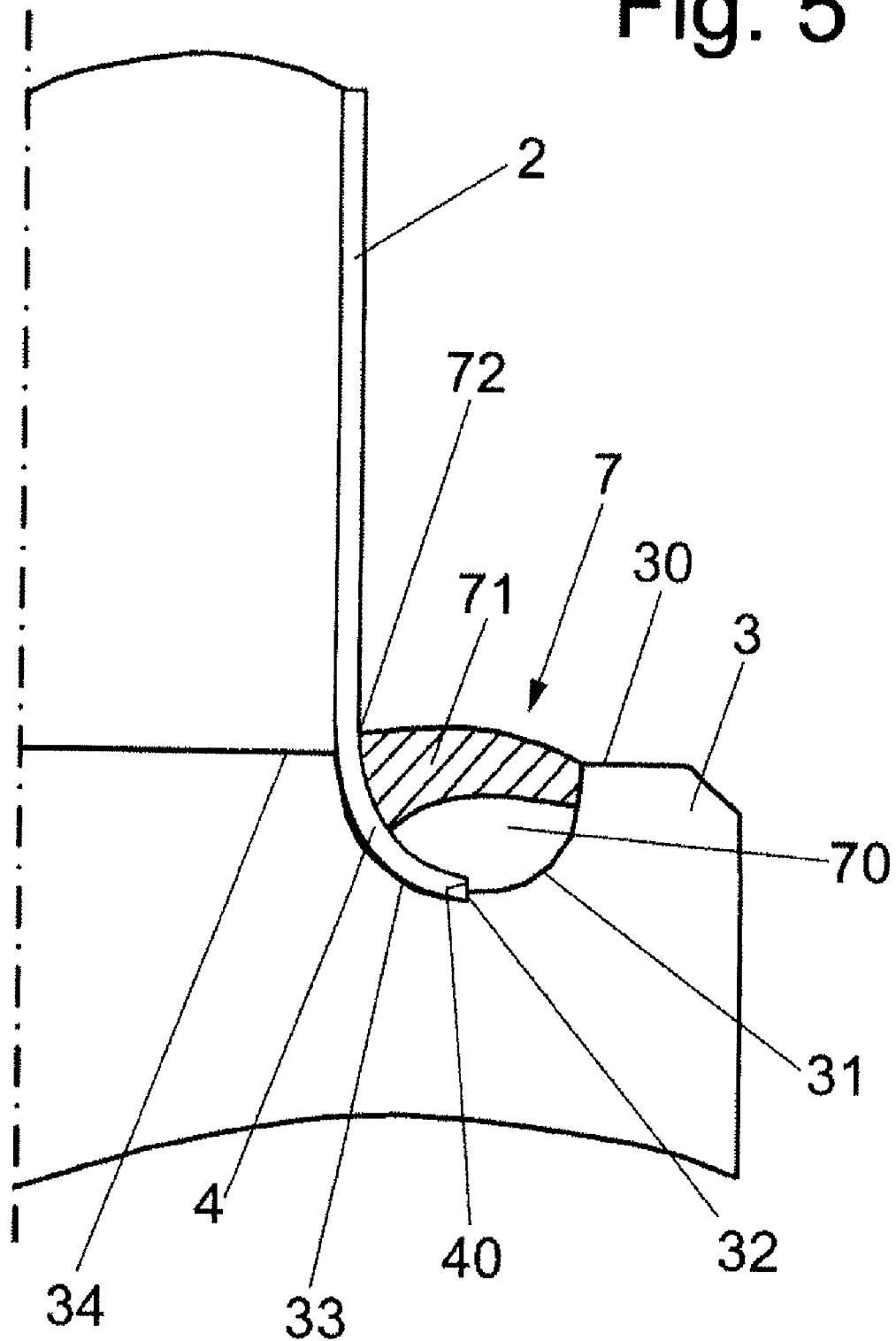
FIG. 5 shows a sectioned view of a further modified embodiment of a tube connection.

Shown in FIG. 5 is an exemplary embodiment of a tube connection in which a receptacle for the weld deposit 7 and the widened section 4 of the tube 2 is formed on the component 3 made of cast material. Starting from a ring 30, the receptacle comprises a recess having a bend 31 which runs radially inward, is of curved design, and extends up to a step 32. Formed adjacent to the step 32 is a further curved section 33 which bears against an inner bend of the widened section 4. The receptacle extends up to an end of a connection piece 34, which is partly fitted into the tube 2 as a solid profile or hollow profile. The step 32 in this case causes the widened section 4 to bear with an end face 40 partly against the step 32 and against the component 3. As a result, radial forces can be dissipated directly onto the component 3.

Furthermore, the receptacle surrounded by the ring 30 is filled with weld deposit 7 which is formed by multiple passes and comprises weld deposit 70 from initial welding and weld deposit 71 from subsequent welding. As a result, thermal stresses due to the welding are reduced. A transition 72 between the weld deposit 7 and the tube 2 is formed at least at right angles, it being possible for the weld deposit 7 to also run slightly upward onto the tube 2 in order to avoid gaps at the transition 72.

A tube connection having a tube 2 and a component 3 made of cast material is shown in FIG. 6, in which tube connection brazing rings 20 and 21 melting at low temperatures are provided between an end widened section 4 of the tube 2 and the component 3 made of cast material. A first brazing ring 20 is in this case provided at the end of the widened section 4, and a second brazing ring 21 is arranged at the transition between the widened section 4 and the cylindrical section of the tube 2. The connection between the cast part 3 and the tube 2 is strengthened and possibly a corrosion attack in this region countered by the brazing rings 20 and 21 which melt at low temperatures.

An embodiment of a tube connection between a tube 2' and a component 3 made of cast material is shown in FIGS. 7A and 7B, in which connection one or more profiled portions 22 are incorporated in the tube 2' in order to increase the torsional strength. These profiled portions 22 are designed as radial notches or as an annular recess and serve to enable weld deposit 7 to flow into the profiled portions 22 during the welding, a factor which increases the torsional strength. Such profiled portions 22 may also be provided in conjunction with the apertures 11 on the tube 2 or 2'.

To produce the torsional strength, apertures 11 are provided on the widened section 4 or 4' in the exemplary embodiments shown. It is also possible to obtain a torsionally fixed connection by the widened section being given a contour deviating from the circular shape, in particular by it being given an oval shape, such that rotation of the tube 2 relative to the aluminum component 3 is avoided.

In view of the foregoing, other embodiments and variations may be appreciated by those skilled in the art. Those embodiments and variations are intended to be encompassed by the invention.

The invention claimed is:

1. A method for connecting a tube and a cast component, comprising:
widening an end section of the tube to form a widened section;
positioning the cast component adjacent to the widened section;

welding the cast component to enclose at least a portion of the widened section with a weld deposit in at least one step, thereby locking the tube and the cast component together; and creating at least one aperture in the widened section before welding.

2. The method of claim 1, wherein the weld deposit annularly encloses the widened section.

3. The method of claim 1, wherein the widened section is at least one of a flared portion and a flanged portion of the tube.

4. The method of claim 1, wherein the cast component includes a stop, the method further comprising:

pressing the widened section against the stop, wherein the welding comprises at least two steps to form the weld deposit.

5. The method of claim 1, wherein the welding comprises at least two steps to form the weld deposit.

6. The method of claim 1, further comprising:

creating at least one profiled portion in the tube adjacent to the widened section before welding.

7. The method of claim 1, wherein the widened section is oval shaped.

8. A method for connecting a tube and a cast component, comprising:

widening an end section of the tube to form a widened section;

positioning the cast component adjacent to the widened section;

welding the cast component to enclose at least a portion of the widened section with a weld deposit in at least one step, thereby locking the tube and the cast component together; and providing at least one brazing ring between the widened section and the cast component before welding.

9. The method of claim 8, wherein the weld deposit annularly encloses the widened section.

10. The method of claim 8, wherein the widened section is at least one of a flared portion and a flanged portion of the tube.

11. The method of claim 8, wherein the cast component includes a stop, the method further comprising:

pressing the widened section against the stop, wherein the welding comprises at least two steps to form the weld deposit.

12. The method of claim 8, wherein the welding comprises at least two steps to form the weld deposit.

13. The method of claim 8, creating at least one aperture in the widened section before welding.

14. The method of claim 8, creating at least one profiled portion in the tube adjacent to the widened section before welding.

15. The method of claim 8, wherein the widened section is oval shaped.

* * * * *